(12) United States Patent
Shimizu

(10) Patent No.: US 7,526,316 B2
(45) Date of Patent: Apr. 28, 2009

(54) MOBILE PHONE AND MOBILE PHONE CONTROL METHOD

(75) Inventor: Nobuo Shimizu, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 479 days.

(21) Appl. No.: 11/354,938

(22) Filed: Feb. 16, 2006

(65) Prior Publication Data

US 2007/0015534 A1 Jan. 18, 2007

(30) Foreign Application Priority Data

Jul. 12, 2005 (JP) ............................. 2005-203066

(51) Int. Cl.
*H04B 1/38* (2006.01)
(52) U.S. Cl. .................... 455/557; 361/683; 709/238; 715/733; 715/740; 715/788; 345/156; 345/158; 345/159; 345/163
(58) Field of Classification Search ................. 455/557, 455/566; 361/683; 709/238; 715/733, 740, 715/788, 856–862, 840–841; 345/156, 158, 345/159, 163
See application file for complete search history.

(56) References Cited

U.S. PATENT DOCUMENTS

| | | | | |
|---|---|---|---|---|
| 6,437,803 | B1 * | 8/2002 | Panasyuk et al. ............. | 715/733 |
| 6,545,666 | B1 * | 4/2003 | Culler ........................ | 345/168 |
| 6,795,055 | B1 * | 9/2004 | Culler ........................ | 345/157 |
| 6,954,355 | B2 * | 10/2005 | Gerstner et al. ............. | 361/683 |
| 7,409,209 | B2 * | 8/2008 | Adan et al. .................. | 455/420 |
| 2004/0135819 | A1 | 7/2004 | Maa | |
| 2004/0261103 | A1 * | 12/2004 | Ohno et al. ................... | 725/38 |
| 2005/0091607 | A1 * | 4/2005 | Satou et al. ................. | 715/788 |
| 2005/0193143 | A1 * | 9/2005 | Meyers et al. ............... | 709/238 |
| 2005/0235214 | A1 * | 10/2005 | Shimizu et al. ............. | 715/740 |
| 2006/0055678 | A1 * | 3/2006 | Kleihorst et al. ............ | 345/173 |

FOREIGN PATENT DOCUMENTS

DE 19521453 A1 12/1996
DE 19521453 A 1 * 12/1996

OTHER PUBLICATIONS

"Software realizing remote operation of PC from mobile phone", IBM Japan, printed on Dec. 22, 2005, pp. 1-2 http://www-06.ibm.com/jp/press/2002/05271.html.

(Continued)

*Primary Examiner*—Edward Urban
*Assistant Examiner*—Junpeng Chen
(74) *Attorney, Agent, or Firm*—Oblon, Spivak, McClelland, Maier & Neustadt, P.C.

(57) ABSTRACT

In a mobile phone remotely operating an information device, a communication unit receives information displayed on the information device. A display device displays a part of the information. A plurality of operation buttons respectively inputs an operation signal. A display control unit divides a screen of the display device into a plurality of cells, discriminately displays each of the plurality of cells on the screen, and displays a cursor on the screen. The cursor overlaps the part of the information on the screen. An operation control unit moves the cursor on one of the cells on the screen in response to the operation signal.

15 Claims, 15 Drawing Sheets

BY PUSHING A SPECIAL KEY, "3×3" LATTICES ARE DISPLAYED.

BY SELECTING ONE CELL USING "[1]~[9]" DIAL KEY, SMALL CELLS ARE DISPLAYED IN THE CELL.

OTHER PUBLICATIONS

"PC World included AT&T Labs (Cambridge) Virtual Network Computer Software in its Apr. 1 feature on the evaluation of remote PC software", AT&T Labs-Research In the Spotlight, printed on Dec. 22, 2005, pp. 1-2 http://www.research.att.com/spotlight/200204.html.

Masato Nakasu, "Research of a computer remote operation system using a mobile phone", printed on Dec. 22, 2005, pp. 1-2 http://www.iplab.cs.tsukuba.ac.jp/~baru/research/keitai.html.

* cited by examiner

CURSOR LOCATED ON ANY POSITION IS MOVED TO A CENTER POSITION BY PUSHING A SPECIAL BUTTON

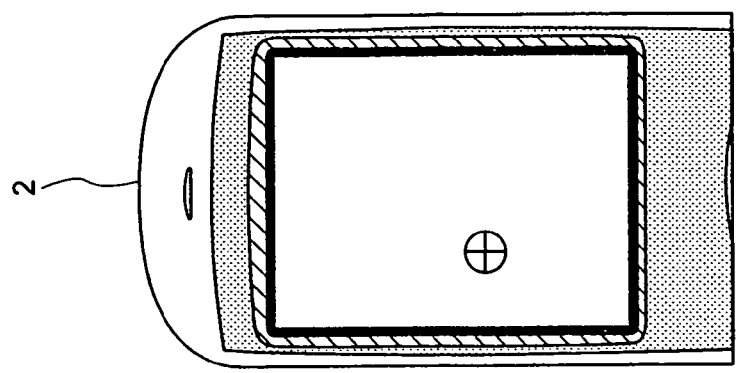
FIG. 9D BUTTON IS PUSHED.
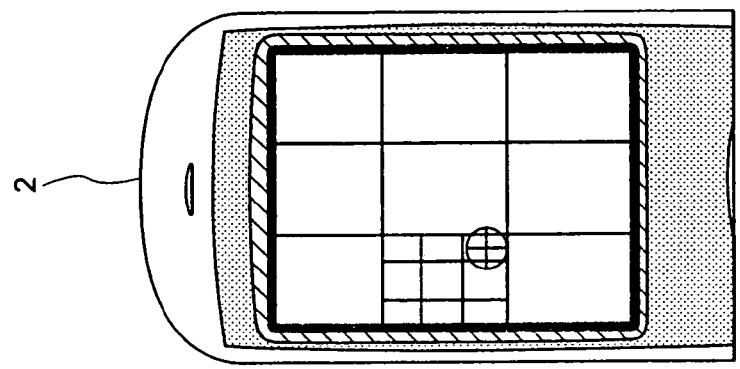
FIG. 9C BY SELECTING ONE SMALL CELL USING "[1]~[9]" DIAL KEY, A CURSOR POSITION IS CONFIRMED.
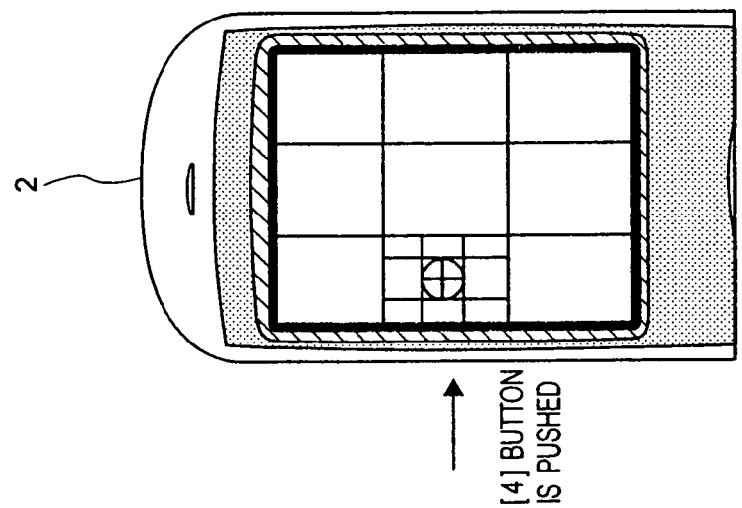
FIG. 9B BY SELECTING ONE CELL USING "[1]~[9]" DIAL KEY, SMALL CELLS ARE DISPLAYED IN THE CELL.
[4] BUTTON IS PUSHED
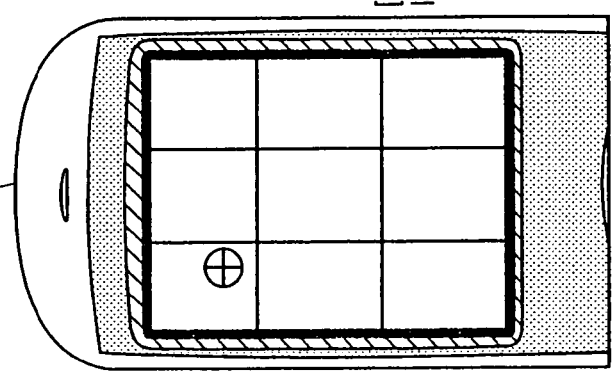
FIG. 9A BY PUSHING A SPECIAL KEY, "3×3" LATTICES ARE DISPLAYED.

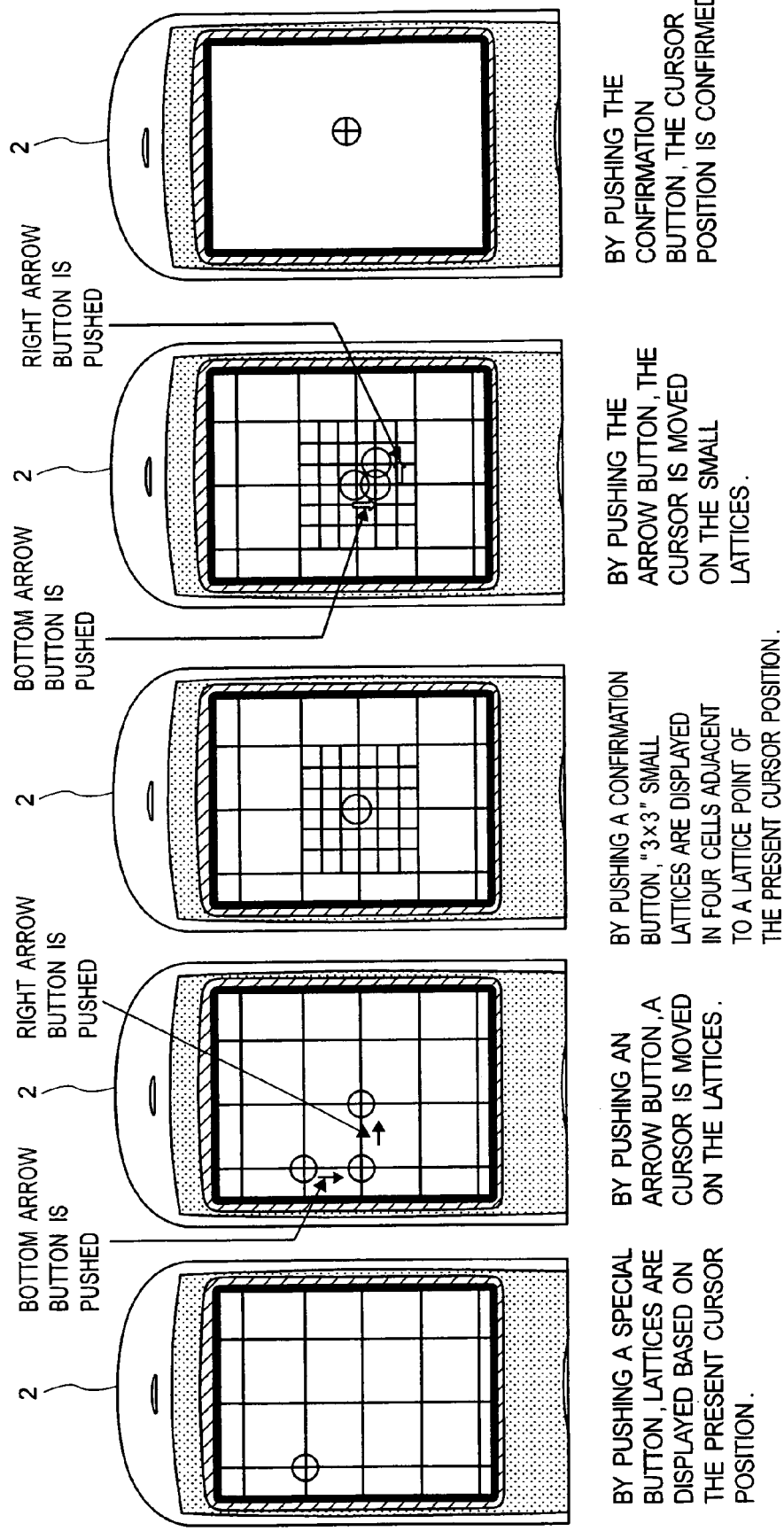

BOTTOM ARROW
BUTTON IS
PUSHED

[CALL] BUTTON IS PUSHED

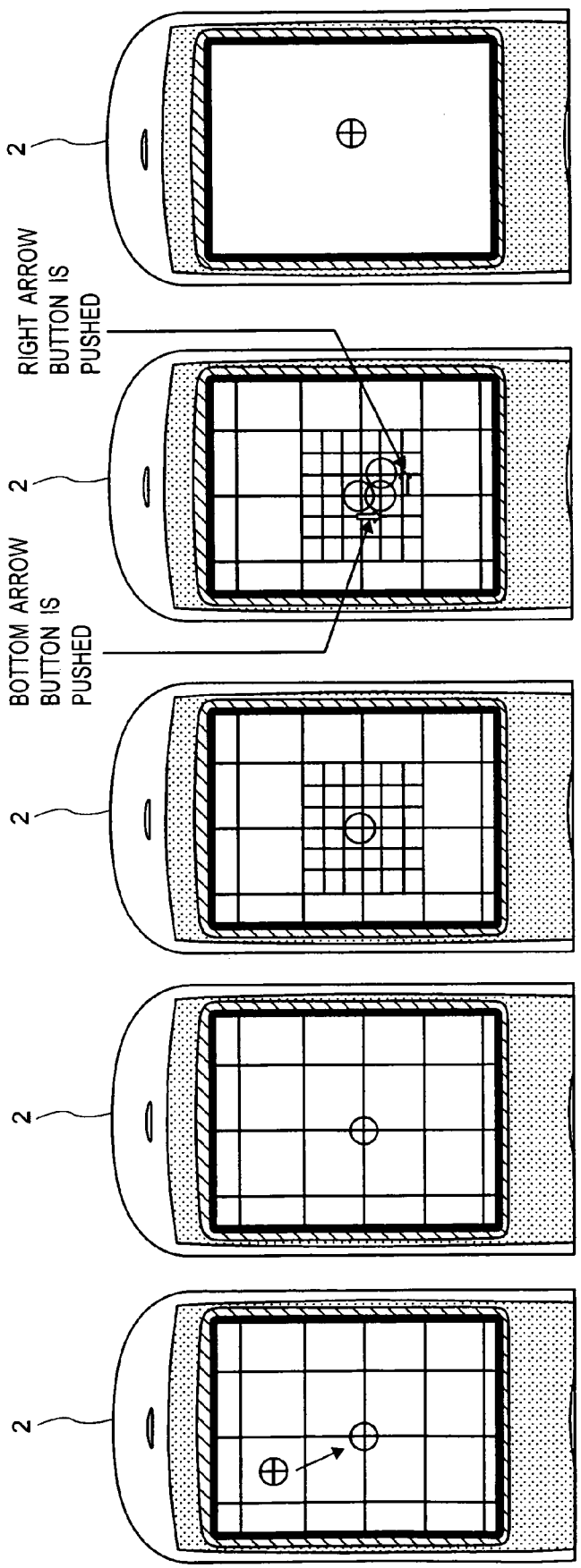

MOBILE PHONE AND MOBILE PHONE CONTROL METHOD

CROSS-REFERENCE TO RELATED APPLICATIONS

This application is based upon and claims the benefit of priority from prior Japanese Patent Application No. 2005-203066, filed on Jul. 12, 2005; the entire contents of which are incorporated herein by reference.

FIELD OF THE INVENTION

The present invention relates to a mobile phone for remotely operating an information device, such as a personal computer, through a network, and a related method.

BACKGROUND OF THE INVENTION

Information devices often connect to a network, such as a mobile phone connectable to the Internet or a PDA (Personal Digital Assistant) connectable to a wireless LAN (Local Area Network). Furthermore, a display apparatus of some information devices have a high resolution, and an image can be finely displayed. Accordingly, by connecting a first information device with a second information device remotely located such as a personal computer (Hereinafter, PC), the first information device can control the second information device and can access data stored on the second information device.

For example, a technique to operate a PC (software is previously installed) from a mobile phone or a PDA (WEB browser is usable) via a network is disclosed in the following. IBM Japan "Software realizing remote operation of PC from mobile phone", [online], press release, [retrieval on Jun. 28, 2005], Internet <URL:

http://www-06.ibm.com/jp/press/2002/05271.html>

Furthermore, a technique to operate a PC (software is previously installed) from a WEB browser or a private viewer (predetermined language is usable) is disclosed in the following.

AT&T Labs-Research In the Spotlight "PC World included AT&T Labs (Cambridge) Virtual Network Computer Software in its 1 April feature on the evaluation of remote PC software", [online], [retrieval on Jun. 28, 2005], Internet <URL:

http://www.research.att.com/spotlight/200204.html>

Furthermore, by setting a relay server between a mobile phone and a PC and by communicating the relay server with the mobile phone using an original protocol, a system to operate the PC from the mobile phone is disclosed in the following. Masato NAKASU "Research of a computer remote operation system using a mobile phone", [online], Tsukuba University, [retrieval on Jun. 28, 2005], Internet <URL:

http://www.iplab.cs.tsukuba.ac.jp/~baru/research/keit-ai.html>

In the technique disclosed in IBM Japan and NAKASU articles, screen information of the PC or input information from a keyboard or a mouse of the PC are transmitted between the PC and the mobile phone by predetermined communication protocol. Briefly, this technique relates to remote operation from the mobile phone to the PC.

When inputting data to a PC, except for the keyboard, a pointing device such as a mouse or a touch panel is generally used. By using the mouse, a mouse cursor can be moved in a moment to an arbitrary position on a screen of the PC. By immediately pushing a mouse button after moving the mouse cursor, various kinds of menu selection and data input can be executed.

On the other hand, a mobile phone typically includes numerical buttons to dial a telephone number, arrow buttons (directions of top and bottom and right and left) and a confirmation button for menu selection, and several buttons for special operation.

Accordingly, in case of remotely operating a PC using a mobile phone, in comparison with operation of the mouse of the PC, a cursor cannot be moved in a moment to an arbitrary position on a display of the mobile phone. For example, by pushing the arrow buttons (directions of top and bottom and right and left) repeatedly, the cursor is gradually moved to the arbitrary position on the display. Another suitable means to easily move the cursor to the arbitrary position is not actually considered.

An interface by connecting a mouse to a mobile phone is technically possible. However, in this use form, simple movability of the mobile phone falls. By considering operation of the mobile phone while a user's moving to a destination or an vehicle, this interface is not a practical solution method.

In this way, operability to remotely operate the PC using a mobile phone is greatly inferior to operability to directly operate the PC using a mouse.

SUMMARY OF THE INVENTION

The present invention is directed to a mobile phone and a mobile phone control method for remotely operating a PC with high operability using standard operation buttons of the mobile phone.

According to an aspect of the present invention, there is provided a mobile phone having a function to remotely operate an information device, comprising: a communication unit configured to receive information displayed on the information device; a display device displaying a part of the information; a plurality of operation buttons each inputting an operation signal; a display control unit configured to divide a screen of the display device into a plurality of cells, to discriminately display each of the plurality of cells on the screen, and to display a cursor on the screen, the cursor overlapping with the part of the information; and an operation control unit configured to move the cursor to one of the cells of the screen in response to the operation signal.

According to another aspect of the present invention, there is also provided a method for controlling a mobile phone remotely operating an information device, comprising: receiving information displayed on the information device; displaying a part of the information on a screen of the mobile phone; inputting an operation signal through a plurality of operation buttons; dividing the screen into a plurality of cells; discriminately displaying each of the plurality of cells on the screen; displaying a cursor on the screen, the cursor overlapping the part of the information; and moving the cursor to one of the cells of the screen in response to the operation signal.

According to still another aspect of the present invention, there is also provided a computer program product, comprising: a computer readable program code embodied in said product for causing a computer to control a mobile phone remotely operating an information device, said computer readable program code comprising: a first program code to receive information displayed on the information device; a second program code to display a part of the information on a screen of the mobile phone; a third program code to input an operation signal through a plurality of operation buttons; a fourth program code to divide the screen into a plurality of cells; a fifth program code to discriminately display each of the plurality of cells on the screen; a sixth program code to display a cursor on the screen, the cursor overlapping the part of the information; and a seventh program code to move the cursor to one of the cells of the screen in response to the operation signal.

BRIEF DESCRIPTION OF THE DRAWINGS

FIGS. 9A~9D are schematic diagrams of an operation of the mobile phone according to the second embodiment.

FIGS. 11A~11E are schematic diagrams of a first operation of the mobile phone according to the third embodiment.

FIGS. 16A~16E are schematic diagrams of the operation of a mobile phone according to a fourth embodiment.

DETAILED DESCRIPTION OF THE EMBODIMENTS

Figure 1:
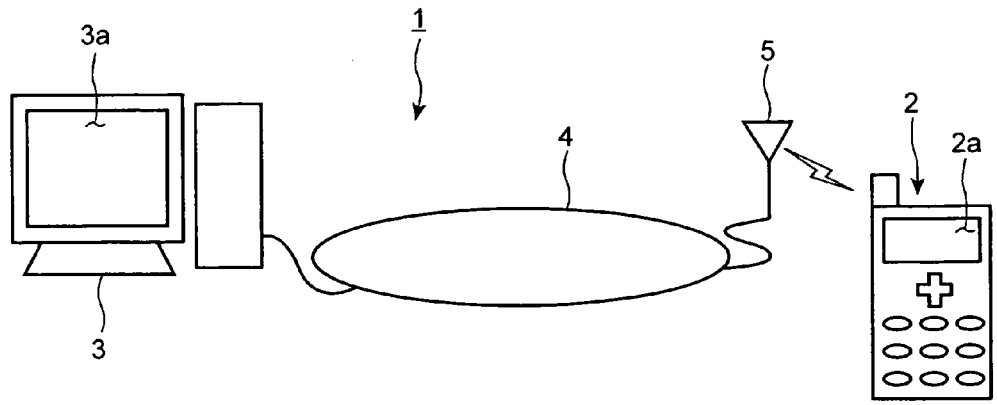
FIG. 1 is a component example of an information device remote operation system connected with a mobile phone.

Hereinafter, various embodiments of the present invention will be explained by referring to the drawings. The present invention is not limited to the following embodiments.

The First Embodiment

FIG. 1 is a block diagram of an information device remote operation system 1.

In embodiments of the present invention, a mobile phone 2 is connected with an information device 3 via an electric communication circuit or network 4 and a base station 5. The information device 3 is, for example, a personal computer.

In the information device remote operation system 1, the information device 3 located in an office or a home, for example, can be remotely operated using the mobile phone.

Screen information on a display 3a of the information device 3 is received via the electric communication circuit 4, and displayed on a display 2a of the mobile phone 2. Normally, the display 2a of the mobile phone 2 is smaller than the display 3a of the information device 3. Accordingly, a part of the screen information on the display 3a is displayed on the display 2a.

On the other hand, in case of operating or inputting data from the mobile phone 2 to the information device 3, operation buttons set on the mobile phone 2 are used.

In case of directly operating the information device 3, by using a pointing device such as a mouse or a touch pad, a mouse cursor (Hereinafter, a cursor) can be moved in a moment to an arbitrary position on the display 3a.

In the mobile phone 2, portable movability is important, and the pointing device such as the mouse or the touch panel is not normally used. Accordingly, in the background art, moving operation of the cursor is not effective. In the present invention, technique to effectively operate moving of the cursor is provided. As a result, operability of remote operation by the mobile phone 2 rises.

Figure 2:
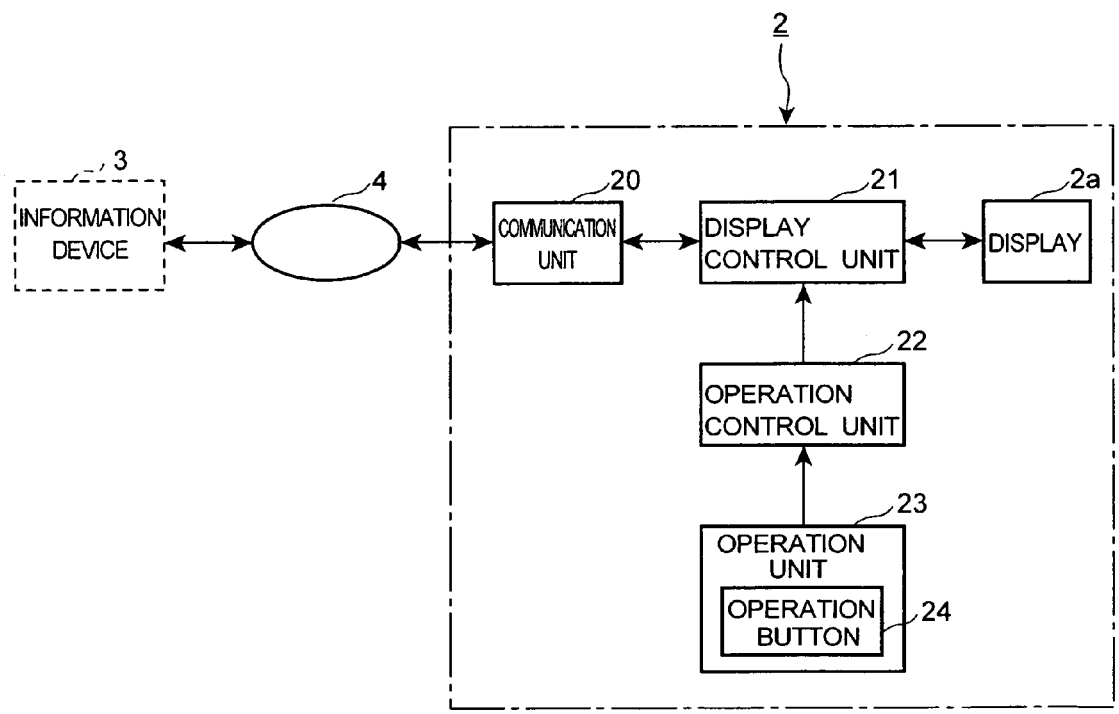
FIG. 2 is a block diagram of a mobile phone.

FIG. 2 is a block diagram of the mobile phone 2.

The mobile phone 2 includes a communication unit 20, a display control unit 21, a display 2a, an operation control unit 22, and an operation unit 23.

The communication unit 20 executes data communication with the information device 3 via the electric communication circuit 4. The display control unit 21 controls the display 2a of the mobile phone 2 to display the screen information sent from the information device 3. Furthermore, the display control unit 21 controls the display 2a to display a cursor and grid lines (explained afterwards).

The display 2a is, for example, a liquid crystal display.

The operation control unit 22 executes various kinds of data conversion based on input data from operation buttons 24 of the operation unit 23.

Figure 3:
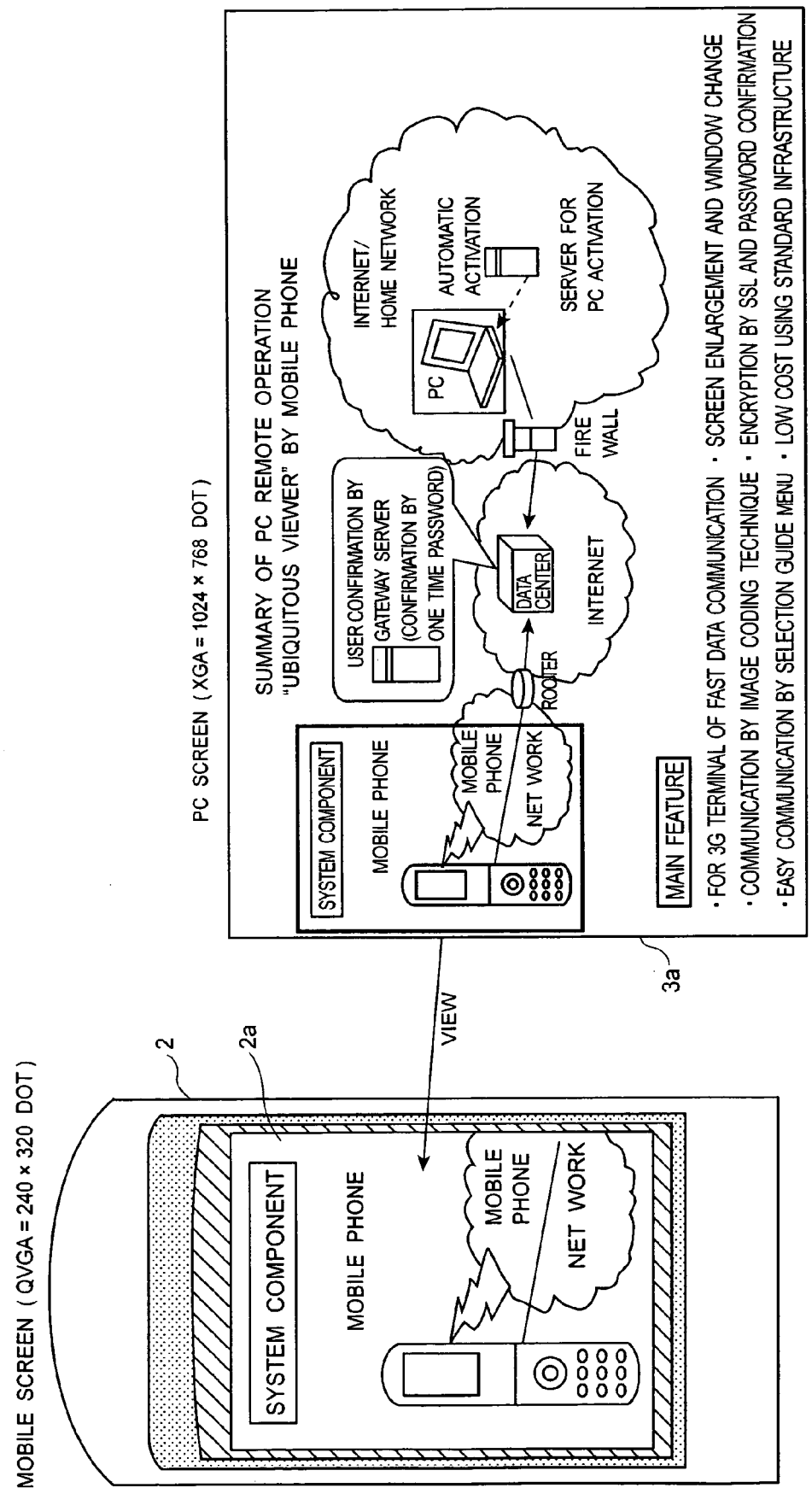
FIG. 3 is a display example of a display device of a mobile phone.

FIG. 3 shows screen information on the display 3a of the information device 3 as a remote operation object and a part of the screen information on the display 2a of the mobile phone 2.

The display 3a of the information device 3 such as the personal computer includes a relative large screen. For example, the screen is composed by pixels of "(1024 dots)×(768 dots)" (XGA standard). On the other hand, while a screen of the display 2a may have a high resolution, the display 2a is smaller than the display 3a. For example, the screen is composed by pixels of "(240 dots)×(320 dots)" (QVGA standard).

Accordingly, in case of displaying screen information of the display 3a of the information device 3 on the display 2a of the mobile phone 2, a part of the screen information is extracted and displayed on the display 2a.

Figure 4:
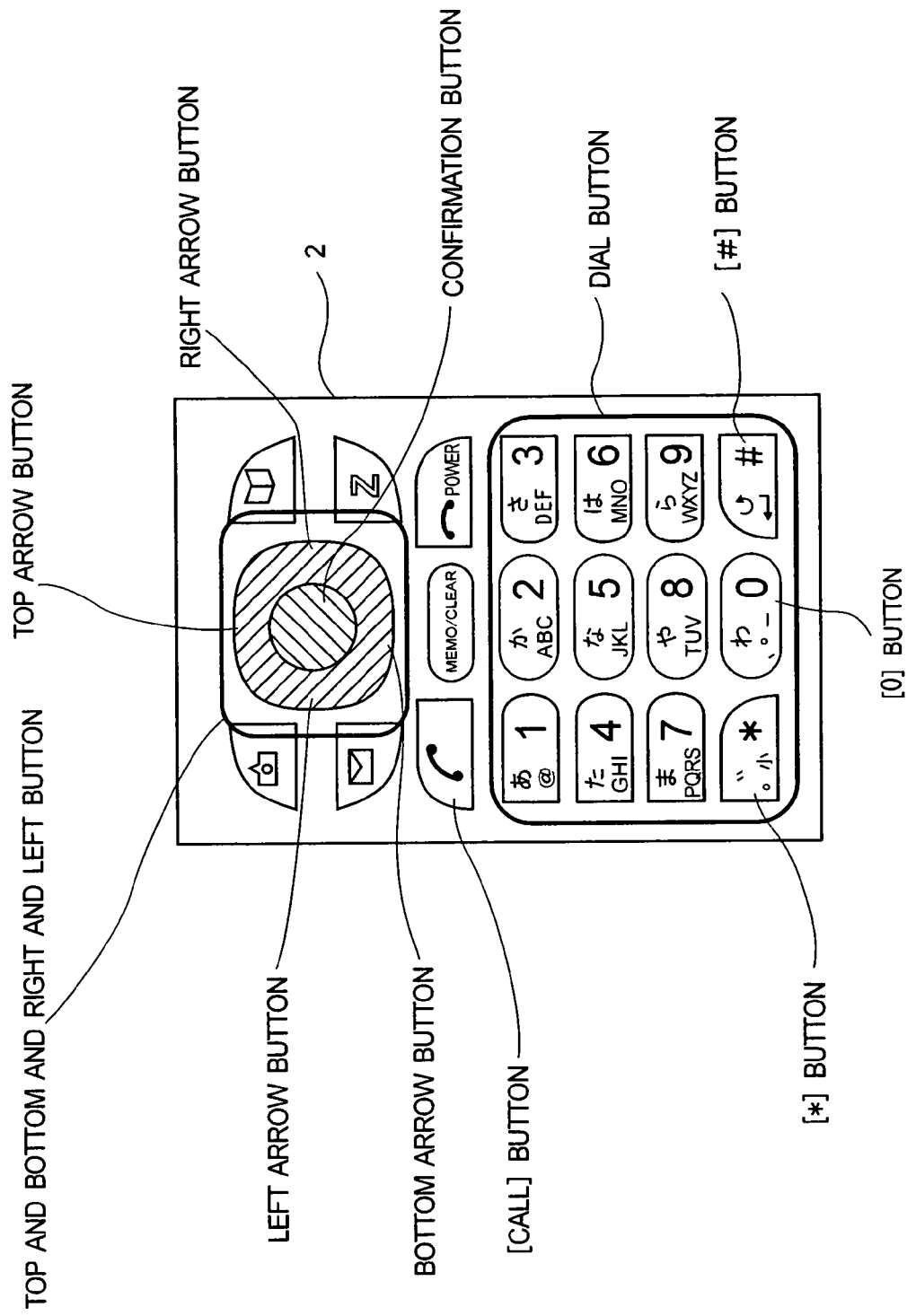
FIG. 4 is one example of operation buttons of a mobile phone.

FIG. 4 is a schematic diagram of an operation panel (operation unit 32) of the mobile phone 2. The operation unit 23 includes a plurality of operation buttons 24.

On an upper part of the operation unit 23, four arrow buttons of top and bottom and right and left, i.e., "top" arrow button, "bottom" arrow button, "right" arrow button, and "left" arrow button, are located. Furthermore, on a center part, surrounded by the four arrow buttons, "confirmation" button is located.

On lower part of the operation unit 23, dial buttons are located. The dial buttons include "1" button~"9" button located as ((three lines)×(three rows)), "0" button, "*" button, and "#" button. Furthermore, "call" button is prepared.

Figure 5:
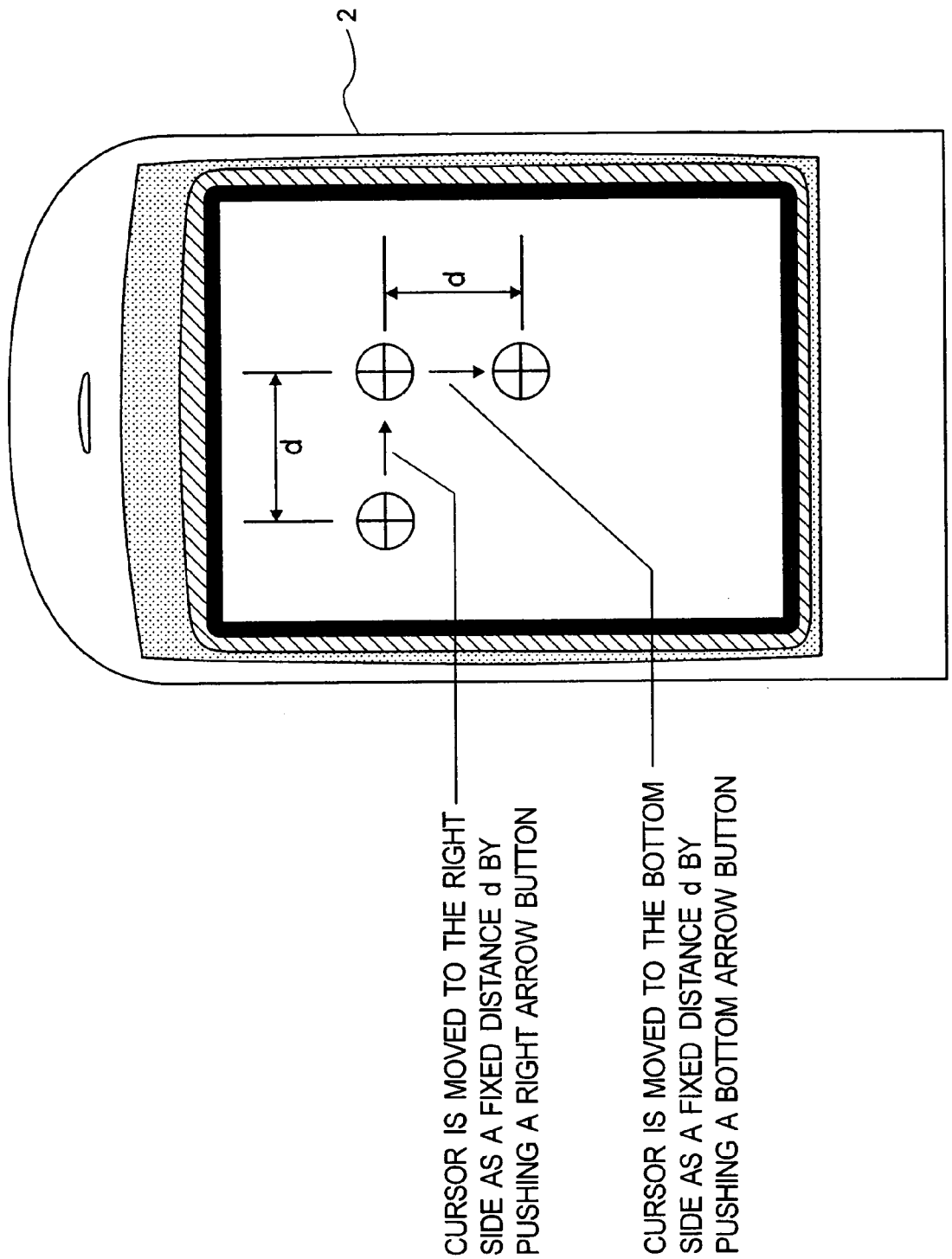
FIG. 5 is a schematic diagram of operation of a mobile phone.

FIG. 5 is a schematic diagram to explain prior method for moving a cursor using the operation buttons 24.

In FIG. 5, a symbol ("+" surrounded by "O") represents a cursor. In case of moving a cursor, arrow buttons of top and bottom and right and left are often used. Briefly, whenever the arrow buttons are pushed, the cursor is moved a moving distance d. In example of FIG. 5, the cursor is moved to the right by pushing a "right" arrow button one time, and the cursor is moved to the bottom by pushing a "bottom" arrow button one time.

At timing that the cursor is moved to a desired position, for example, by pushing a "confirmation" button, operation equivalent to click a mouse button of the information device 3 is realized.

If the moving distance d is fixed, the cursor cannot be pointed on a middle point of the moving distance d. Accordingly, the moving distance d can be changed by set.

For example, in status that the moving distance d of one time is 8 dot, assume that a cursor is moved to the right direction (+x direction) as 36 dot and the bottom direction (+y direction) as 40 dot. By pushing a "right" arrow button four times and pushing a "bottom" arrow button five times, the cursor is moved to a left side position as 4 dot from the target position. Accordingly, by setting the moving distance d as 4 dot and pushing the "right" arrow button one time, the cursor is moved to the target position. In this case, even if set operation of the moving distance d is excluded, push of operation buttons of ten times is necessary.

In case that a screen size of the mobile phone 2 is "a×b" dot, the moving distance is d dot and the present position of the cursor is (x, y), average of push times of the arrow buttons (top and bottom and right and left) necessary for moving is approximated by following equation (1).

$$\left(\sum_{u=0,1,2,\ldots,x}[(x-u)/d] + \sum_{u=x+1,x+2,\ldots,a}[(u-x)/d]\right)/a + \qquad (1)$$
$$\left(\sum_{v=0,1,2,\ldots,y}[(y-v)/d] + \sum_{v=y+1,y+2,\ldots,b}[(v-y)/d]\right)/b$$

In above equation (1), operation [p] is raised result of part below a decimal point of p.

The equation (1) is a discrete equation. In order to simplify calculation, the equation (1) is approximated by following continuous equation (2).

$$\left(\int_0^x ((x-u)/d)du + \int_x^a ((u-x)/d)du\right)/a + \qquad (2)$$
$$\left(\int_0^y ((y-v)/d)dv + \int_y^b ((v-y)/d)dv\right)/b$$

By calculating the equation (2), following equation is obtained.

$$((x^2-a\cdot x+a^2/2)/(a\cdot d))+((y^2-b\cdot y+b^2/2)/(b\cdot d))$$

Briefly, in case that a screen size of the mobile phone 2 is "a×b" dot, the moving distance is d dot and the present position of the cursor is (x, y), average of push times of the arrow buttons (top and bottom and right and left) necessary for moving is approximated by following equation (3).

$$((x^2-a\cdot x+a^2/2)/(a\cdot d))+((y^2-b\cdot y+b^2/2)/(b\cdot d)) \qquad (3)$$

$$0 \leq x \leq a, 0 \leq y \leq b$$

On assumption that a target point of the cursor is uniformly distributed on area of screen size "(a×b) dot", the equation (3) represents the average of push times.

Nowadays, a screen size of QVGA standard which is a general screen size of the mobile phone 2 is "240×320" dot. Accordingly, by assigning "a=240, b=320" and "d=8" as the moving distance to the equation (3), following equation (4) is obtained.

$$((x^2-240\cdot x+28800)/1920)+((y^2-320\cdot y+51200)/2560) \qquad (4)$$

$$0 \leq x \leq 240, 0 \leq y \leq 320$$

A calculation result of the equation (4) is minimum 17.5 for "(x, y)=(120, 160)" (center on a screen of the display 2a), and maximum 35 for "(x, y)=(0, 0)" (corner of the screen). Average of the calculation result is 23.333.

In order to reduce push times of the operation button, the moving distance d of the cursor by push of one time may be lengthened. However, probability that a position depart from a target position is pointed on the screen is high. As a result, frequency to repeatedly set the moving distance d increases, and actual operation is not effective for a user.

A button operation of the mobile phone 2 includes a long push (remain pushing for a while) and a short push (usual push operation). Accordingly, the moving distance d may be changed between the long push and the short push. Furthermore, by continuously pushing the button after the long push, an operation status is transferred to "repeat" and the long push is repeated. Accordingly, the moving distance d may be changed by repeat times.

However, the long push takes a longer time than the short push. Accordingly, above idea is not definite settlement means to reduce moving time of the cursor.

Figure 6:
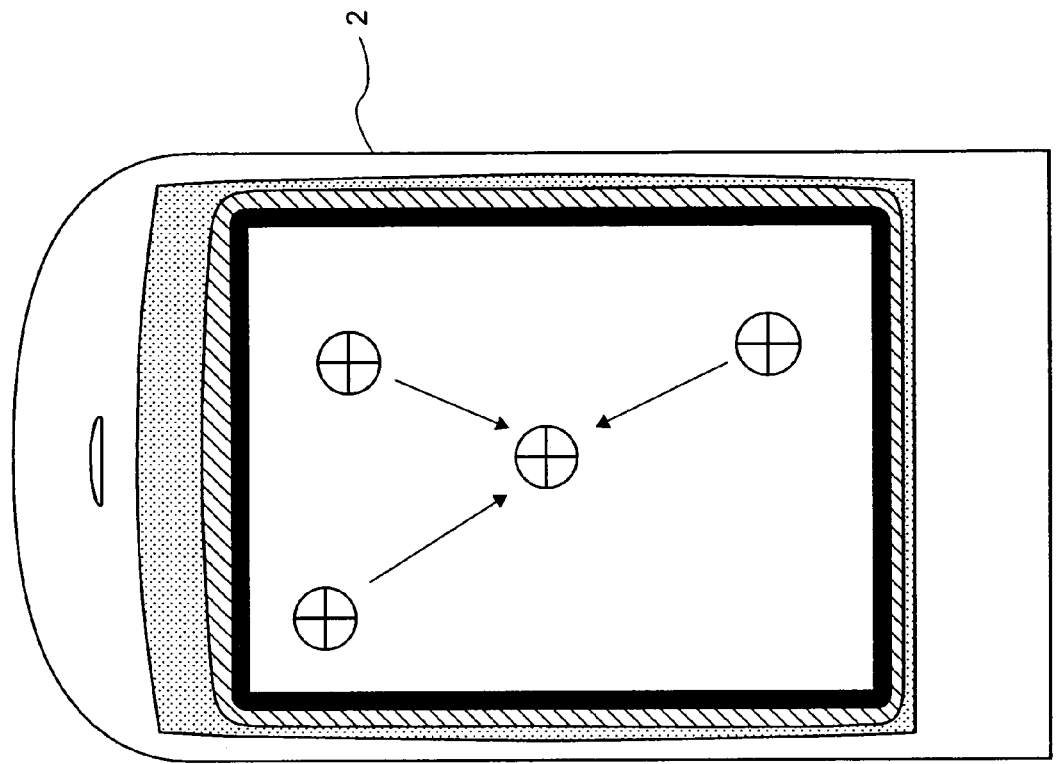
FIG. 6 is a schematic diagram of operation of a mobile phone according to a first embodiment.

FIG. 6 is a schematic diagram of moving method of the cursor according to a first embodiment.

In the mobile phone 2 of the first embodiment, by pushing a special button (For example, "call" button), a cursor is compulsorily moved from the present position to a center of the screen. In the operation control unit 22 of the mobile phone 2, this operation is realized by setting position data of the cursor to a center coordinate "(x, y)=(0, 0)" on the screen when push of "call" button is recognized.

In case that a moving destination (target position) is near the present position of the cursor, the cursor is not necessarily moved to the center. If the cursor is moved to the target position after moving the center by pushing the "call" button, irrespective of the present position of the cursor, the average of push times of operation buttons to move the cursor to the target position is 17.5. By considering push of "call" button, the average is 18.5

As mentioned-above, in case that a cursor is located on arbitrary position of the screen (prior art), the average of push times is 23.333. Accordingly, in the mobile phone 2 of the first embodiment, the average of push times is reduced as about five times. As a result, push time of operation buttons to move the cursor to the target position is shortened and operability improves.

The Second Embodiment

Figure 7:
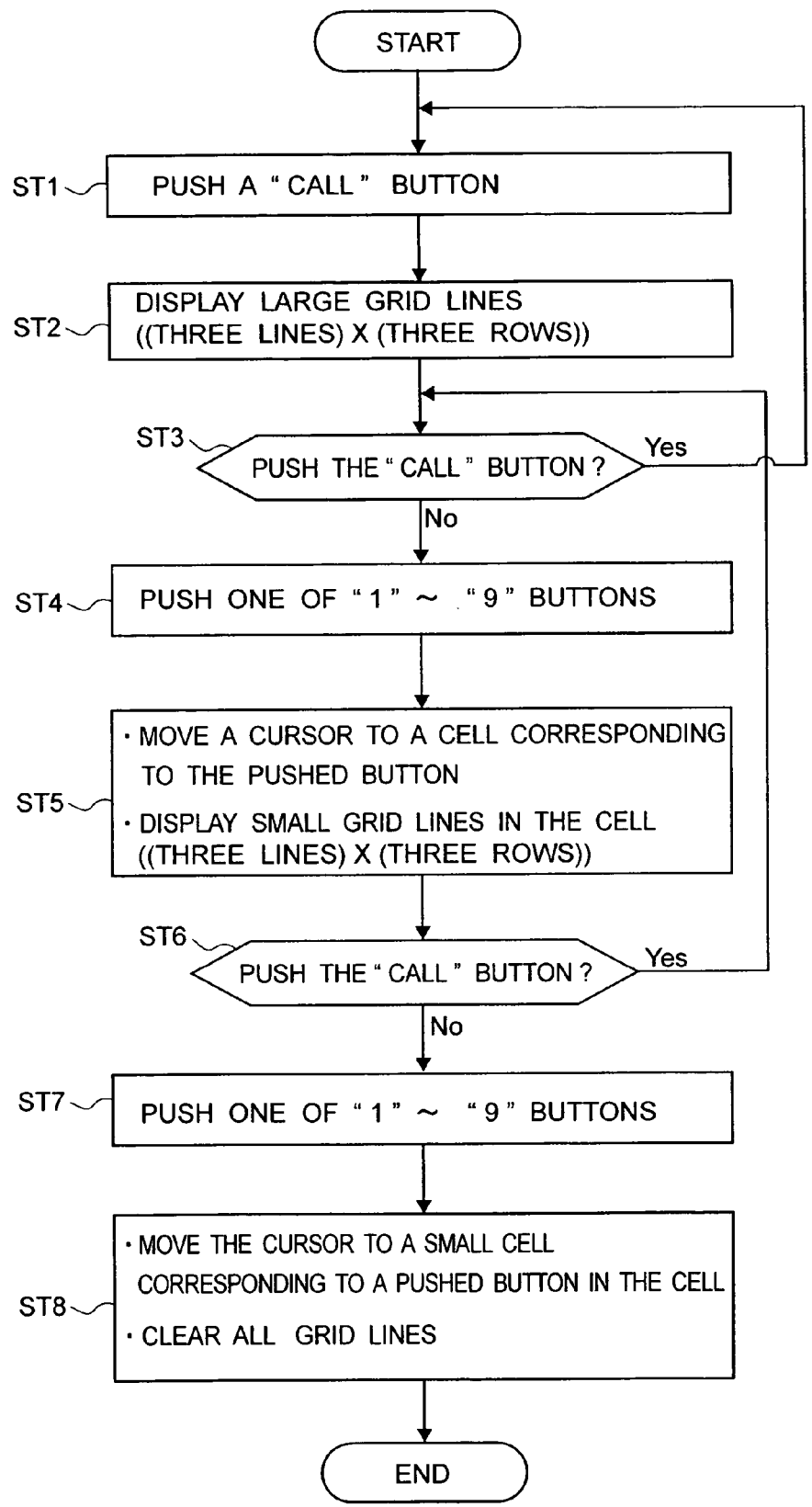
FIG. 7 is a flow chart of an operation method of a mobile phone according to a second embodiment.
Figure 8:
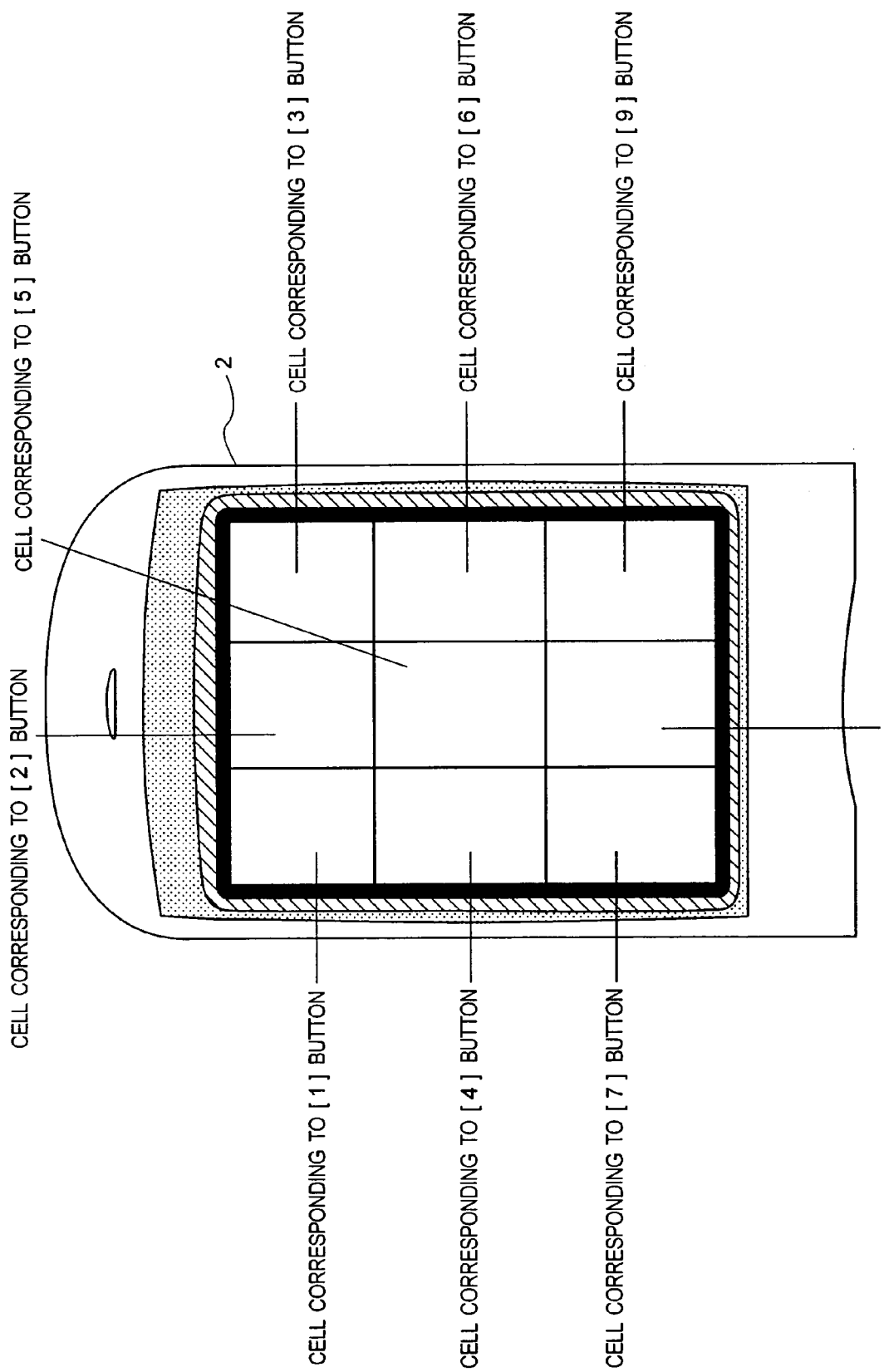
FIG. 8 is a schematic diagram of display status of the mobile phone according to the second embodiment.

FIG. 7 is a flow chart of operation example of the mobile phone 2 according to a second embodiment. FIGS. 8 and 9 are schematic diagrams to explain operation examples of the mobile phone 2 according to the second embodiment.

In the mobile phone 2 of the second embodiment, in order to effectively move a cursor, "1" button~"9" button (first button), and one predetermine button, for example, "call" button (second button), are used.

In case of moving a cursor from the present position, a user first pushes a "call" button (ST1).

By pushing the "call" button, the mobile phone 2 changes processing from a usual operation mode to a quick moving mode of the cursor. Furthermore, by pushing the "call" button, as shown in FIG. 8, the display control unit 21 displays a large grid line (first grid line) of "(three lines)×(three rows)" on the display 2a. Nine large cells (first cell) are formed by this grid line (ST2).

In FIG. 8, the grid line is used for displaying the first cell. However, method for discriminately displaying each cell is not limited to the grid line and any method may be used. For example, lattice points of each cell may be displayed, or a background color of each cell may be different. In the following explanation, a grid line is used to discriminate display of each cell. However, as mentioned-above, another method to discriminately display may be used.

In case of pushing the "call" button again (Yes at ST3), by deciding that previous operation is cancelled, the grid line is cleared (erased) and the processing is advanced to step ST1. In case of not pushing the "call" button, the processing is forwarded to step ST4.

At step ST4, a user pushes any button of nine dial buttons ("1" button~"9" button). "1" button~"9" button are arranged as "(three lines)×(three rows)". As shown in FIG. 8, a large grid line corresponds to a position of each cell divided on the screen. Accordingly, a user can easily select a dial button corresponding to a target position of the cursor by watching cells on the display 2a.

FIG. 9 shows a display example of a screen based on operation flow. FIG. 9A shows a display example on which large grid line is displayed by pushing a "call" button at ST2. In FIG. 9A, a position of a cursor (left upper side) represents a present position of the cursor (before moving).

FIG. 9B shows a display example after pushing a "4" button at ST4. By pushing the "4" button, the cursor is moved to a center of a cell (left middle side) corresponding to a position of the "4" button. Additionally, small grid line (second grid line) of "(three lines)×(three rows)" is displayed in the cell. This grid line forms nine small cells (second cell) (ST5).

In case of pushing the "call" button again (Yes at ST6), previous operation is decided to be canceled, the small grid line is cleared and processing is returned to ST3. In case of not pushing the "call" button, processing is forwarded to ST7.

At ST7, a user selectively pushes "1" button~"9" button corresponding to a target position. In FIG. 9C, "9" button is pushed. By pushing the "9" button, the cursor is moved to a position of the small cell corresponding to the "9" button. Additionally, all grid lines are cleared and a display status is returned to usual operation mode (FIG. 9D). In the operation mode of FIG. 9D, the cursor is moved by unit of a moving distance d (For example, d=8 dot) using arrow buttons (top and bottom and left and right), and the cursor is lastly moved to the target position.

In comparison with a screen size of the display 2a, a vertical length and a horizontal length of the small cell are respectively one ninth. In case that the screen size of the display 2a is "(240 dot)×(320 dot)", a size of the small cell is "(27 dot)×(36 dot)". Accordingly, average of push times of the cursor to move from the present position in FIG. 9D to the target position is obtained by assigning "a=27, b=36, d=8" to the equation (3). This is represented as following equation (5).

$$((x^2-27 \cdot x+364.5)/216)+((y^2-36 \cdot y+648)/288)+3 \quad (5)$$

$$0 \leq x \leq 27, 0 \leq y \leq 36$$

"3" at last term of the equation (5) corresponds to one push of "call" button (ST1) and two pushes of dial button (ST4, ST7). In the equation (5), the minimum is 4.969, the maximum is 6.939, and the average is about 5.625.

Briefly, in the mobile phone 2 of the second embodiment, the average of push times of operation buttons for cursor to move from the present position to the target position is about six, which is a quarter of average "twenty three" of prior art.

As mentioned-above, in the mobile phone 2 of the second embodiment, push times of operation buttons necessary for cursor moving is greatly reduced. Accordingly, a cursor can be moved to a target position for a short time and operability is improved.

The Third Embodiment

Figure 10:
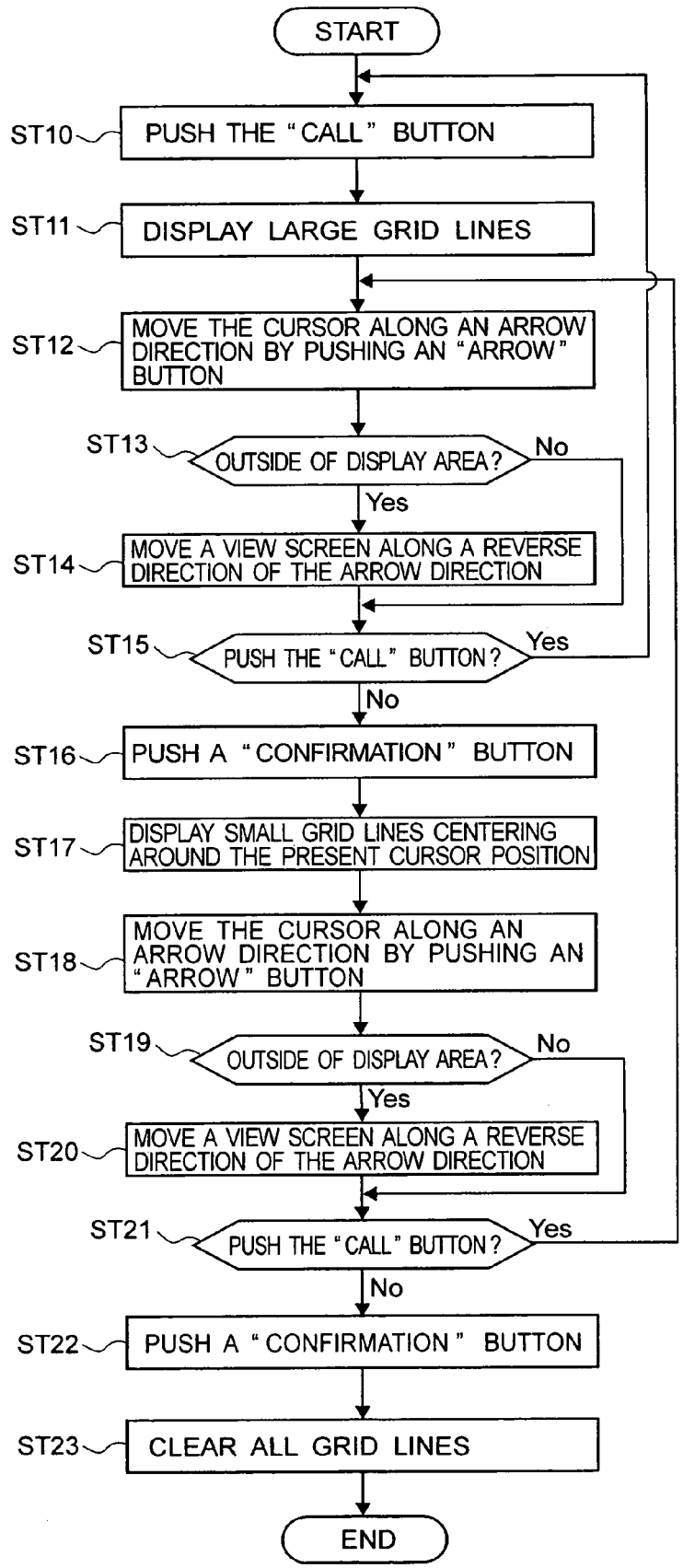
FIG. 10 is a flow chart of an operation method of a mobile phone according to a third embodiment.

FIG. 10 is a flow chart of operation of the mobile phone 2 according to a third embodiment. FIG. 11 is display example of the display 2a based on operation flow of the mobile phone 2 according to the third embodiment.

In the second embodiment, cursor moving is executed using dial buttons ("1" button~"9" button). On the other hand, in the third embodiment, cursor moving is executed using arrow buttons (top and bottom and right and left).

Operation by dial buttons is simple. However, some user operates by confirming a position of the button. On the other hand, arrow buttons (top and bottom and right and left) are easy for the user to operate without confirming the position of the button (blind touch).

In case of moving a cursor using arrow buttons (top and bottom and right and left), a moving direction of the cursor is more important than a position of the cursor on a screen. Accordingly, in the third embodiment, the cursor is displayed on a lattice point of grid line different from the second embodiment (cursor is displayed on a center of the cell). In this display mode, the cursor is moved on the grid line. Accordingly, the grid line represents a locus of the cursor and is congenial to the arrow buttons. As a result, quick operation is possible for the user.

At ST10, by pushing a special button (For example, "call" button (first button)), the mobile phone 2 changes processing from usual operation mode to quick moving mode of cursor.

Furthermore, by pushing "call" button, large grid lines (first grid line) on which the present position of the cursor is one lattice point are displayed on a screen (ST11). FIG. 11A shows this display status.

In the second embodiment, in order to coincide location of dial buttons with location of cells formed by grid lines, the grid line divides the screen into nine cells ((three lines)×(three rows)). However, the third embodiment does not have such restriction. Accordingly, the number of grid lines and space between grid lines can be selected based on visibility. As shown in FIG. 11, a vertical space and a horizontal space between grid lines may be respectively equal. For example, in the third embodiment, a space between grid lines along a vertical direction and a horizontal direction are respectively 80 dots.

A user pushes the arrow buttons (top and bottom and right and left) while watching the display (blind touch) in order to get near the cursor from the present position to the target position. By one push of the arrow buttons, the cursor is moved on the lattice point of each cell (formed by grid lines).

In FIG. 11B, by one push of a "bottom" arrow button and one push of a "right" arrow button, the cursor is moved from the present position to a position adjacent to the target position.

After moving the cursor to a position adjacent to the target point, a user pushes a special button (second button, for example, a "confirmation" button) (ST16).

By pushing the "confirmation" button, small grid lines (second grid line) dividing four cells (first cell) adjoining a lattice point of the cursor are displayed. The small grid lines divide a large cell into nine small cells (second cell). FIG. 11C shows this display status. In the third embodiment, the large cell is respectively divided into three parts along a vertical direction and a horizontal direction. A space between two small cells along the vertical direction and the horizontal direction is respectively 27 dots.

At ST18, by pushing the arrow buttons (top and bottom and right and left), the cursor further nears the target position. In this case, a moving unit of the cursor is the small cell. Accordingly, fine moving of the cursor is possible. In FIG. 11D, by one push of a "bottom" arrow button and one push of a "right" arrow button, the cursor is further moved near the target position.

After moving the cursor near the target position, a user pushes a "confirmation" button (ST22). By pushing the "confirmation" button, the cursor position is determined, and processing is returned from the quick moving mode of the cursor to the usual operation mode. Furthermore, all grid lines are cleared (ST23). FIG. 11E shows this display status.

In case of finely adjusting the cursor position by the usual operation mode, the cursor may be moved by unit of predetermined moving distance d (For example, 8 dots) using the arrow buttons (top and bottom and right and left).

In case of moving the cursor on lattice points of the large grid line, the cursor is moved as 80 dots by one push of the arrow button. As mentioned-above, in the prior art (usual operation mode), a moving distance of one push of the arrow button is 8 dots. Accordingly, average of push times of button is one tenth of the equation (4), i.e., about 2.333.

In case of moving a cursor on lattice points of the small grid line, the cursor is moved on "3×3" small cells divided in the large cell. Accordingly, the average of push times more decreases than average of push times in case of moving a cursor on lattice points of the large grid lines. Briefly, the average of push times in case of moving a cursor on lattice points of the small grid lines is below 2.333.

A size of the small cell is "(27 dots)×(27 dots)". Accordingly, in the usual operation mode, average of push times by unit of 8 dots to finely adjust a cursor position is approximately calculated by the equation (5), i.e., 2.333.

Furthermore, by considering one push of the "call" button and two pushes of the "confirmation" button, average of push times of buttons of the mobile phone 2 of the third embodiment is calculated as follows.

$$2.333+2.333+2.333+3 \approx 10 \text{ (times)} \quad (6)$$

In comparison with average "6" of push times of the mobile phone 2 of the second embodiment, above average "10" is larger. However, in comparison with average "23" of push times of the prior art, above average "10" is below a half of the average "23".

As mentioned-above, in the mobile phone 2 of the third embodiment, in the same way as the second embodiment, push times of operation buttons necessary for cursor moving is greatly reduced. Accordingly, the cursor can be moved to a target position for a short time, and the user's operability improves.

In case of using the arrow buttons (top and bottom and right and left), the cursor is often moved along a direction toward outside of a display area of the display 2a. In this case, in the third embodiment, it is decided whether a moving destination of the cursor is outside of the display area (ST13). In case that the moving destination is outside of the display area, a part of screen information on the display 2a is shifted along a reverse direction of the cursor moving direction, and the cursor is positioned on new screen information on the display 2a.

Figure 12A:
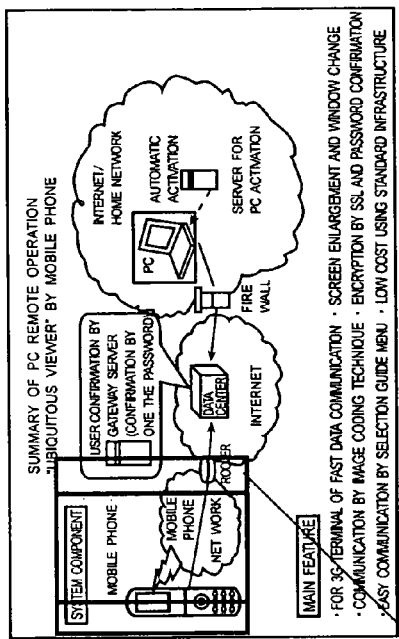
FIGS. 12A-12C are schematic diagrams of a second operation of the mobile phone according to the third embodiment.
Figure 12C:
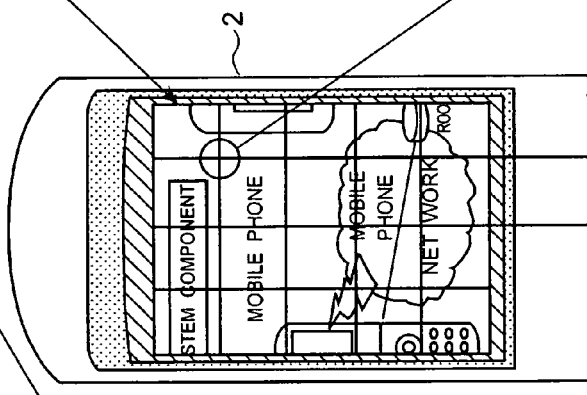
Figure 12B:
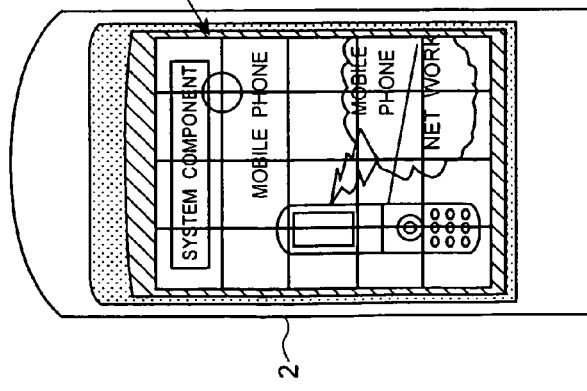

FIGS. 12A, 12B, and 12C show a concrete display example. FIG. 12A shows one example of screen information of the display 3a of the information device 3. A part of the screen information (a region surrounded by left side rectangle in FIG. 12A) is extracted and displayed on the display 2a of the mobile phone 2 as shown in FIG. 12B.

In case of further moving the cursor from the present position on the display 2a of FIG. 12B to the right side (including target position) on the display 2a, the cursor cannot be moved to a target position because the target position is not included in the present screen information of the display 2a. Accordingly, in the third embodiment, for example, in case of pushing a "right" arrow button, a view (a part of the present screen information on the display 3a) is shifted (moved) to the left side on the display 2a as a space between grid lines. As a result, new part of screen information (right side screen information not displayed up to the present) is displayed on the display 2a, and the cursor can be moved to the target position on the new part of screen information.

By this operation as one push of the "right" arrow button, cursor moving and view moving can be simultaneously executed. Accordingly, high effective operability can be realized.

Figure 13B:
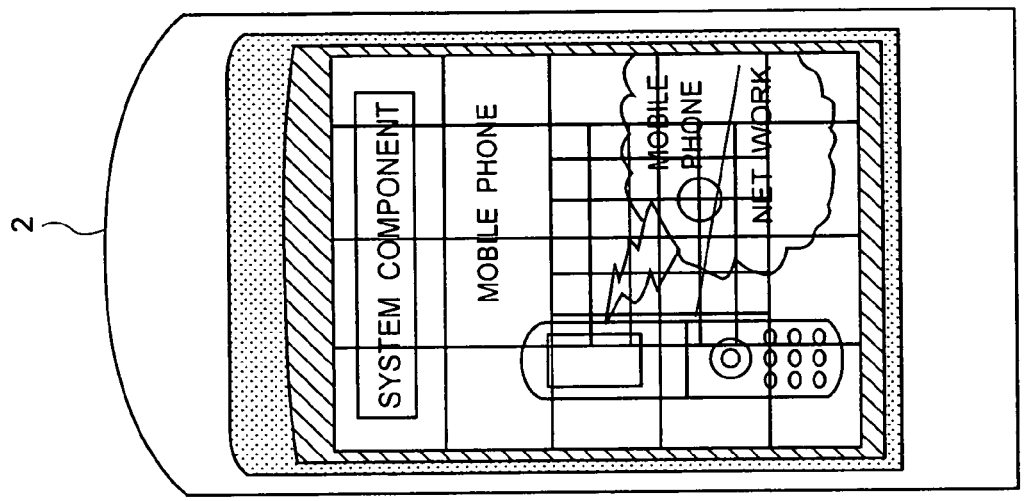
FIGS. 13A and 13B are schematic diagrams of a third operation of the mobile phone according to the third embodiment.
Figure 13A:
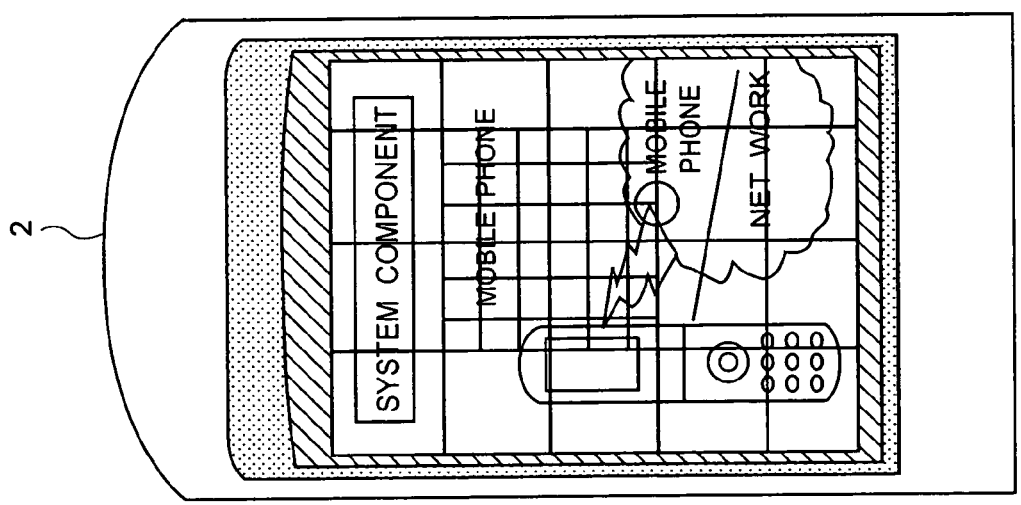

Furthermore, as shown in FIG. 13A, in case of displaying small grid lines, it often happens that a cursor is moved to outside of display area of the small grid lines.

In the third embodiment, in this case, as shown in FIG. 13B, the display area of the small grid lines is automatically shifted (slide) along a moving direction of the cursor. As a result, moving of the cursor using the small grid lines can be continually executed, and the user's operability improves.

Figure 14B:
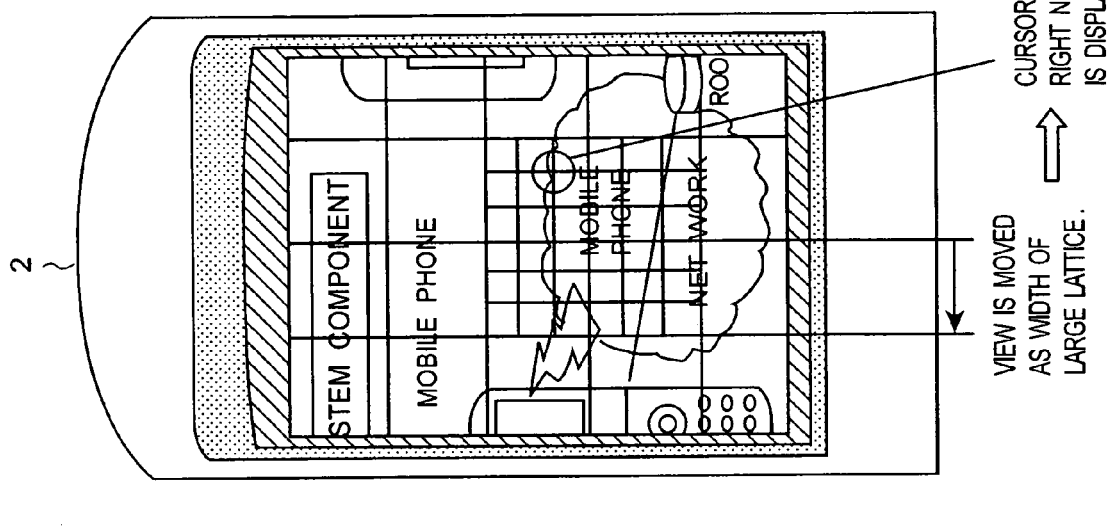
FIGS. 14A and 14B are schematic diagrams of a fourth operation of the mobile phone according to the third embodiment.
Figure 14A:
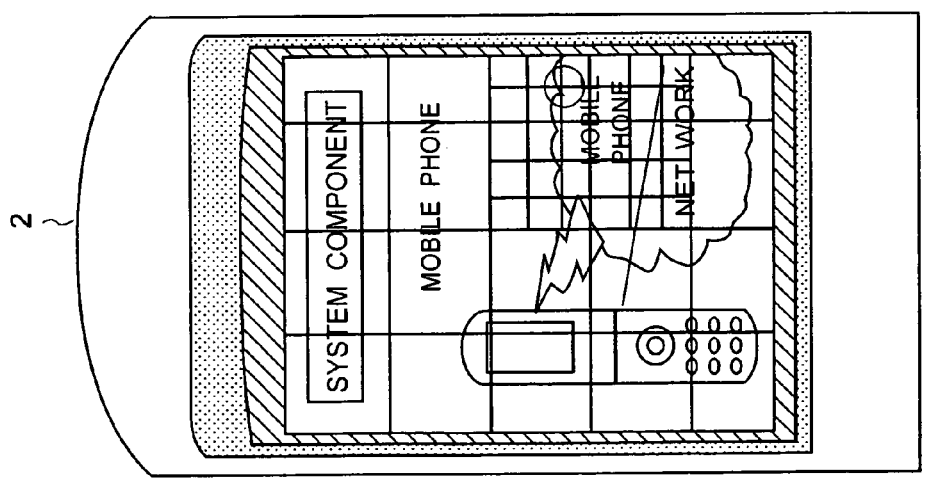

Furthermore, as shown in FIG. 14A, in case of displaying small grid lines, it often happens that a cursor is moved to both outside of display area of the small grid lines and outside of display area of the display 2a.

In the third embodiment, in this case, as shown in FIG. 14B, the display area of the small grid lines and a view of screen information of the display 2a are automatically shifted along a reverse direction of the moving direction of the cursor as a space between large grid lines (ST20). As a result, new part of screen information (right side screen information not displayed up to the present) is displayed on the display 2a, moving of the cursor using the small grid lines can be executed, and the user's operability improves.

In the third embodiment, in the same way as the second embodiment, cancel operation using the "call" button is possible.

At ST15 in FIG. 10, by pushing the "call" button, the large grid lines are cleared, and processing is returned to usual operation mode (ST10).

Figure 15B:
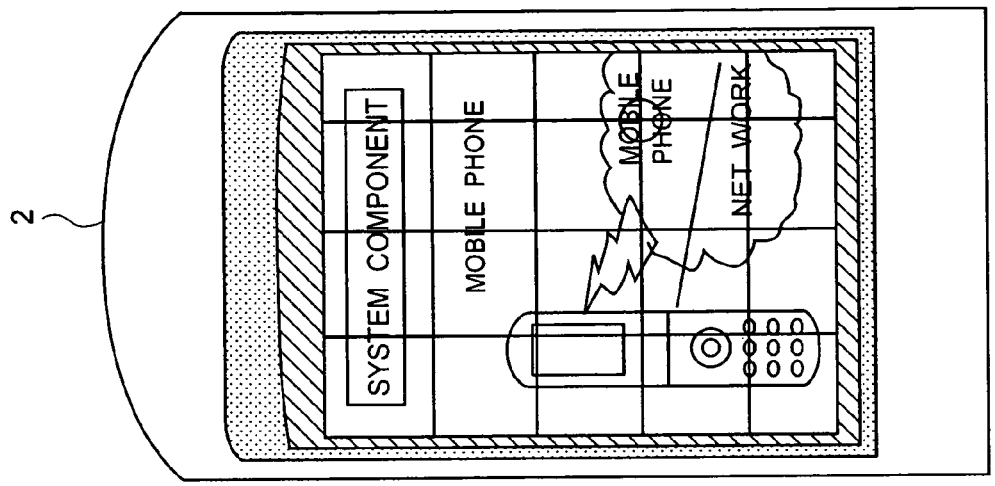
FIGS. 15A and 15B are schematic diagrams of a fifth operation of the mobile phone according to the third embodiment.
Figure 15A:
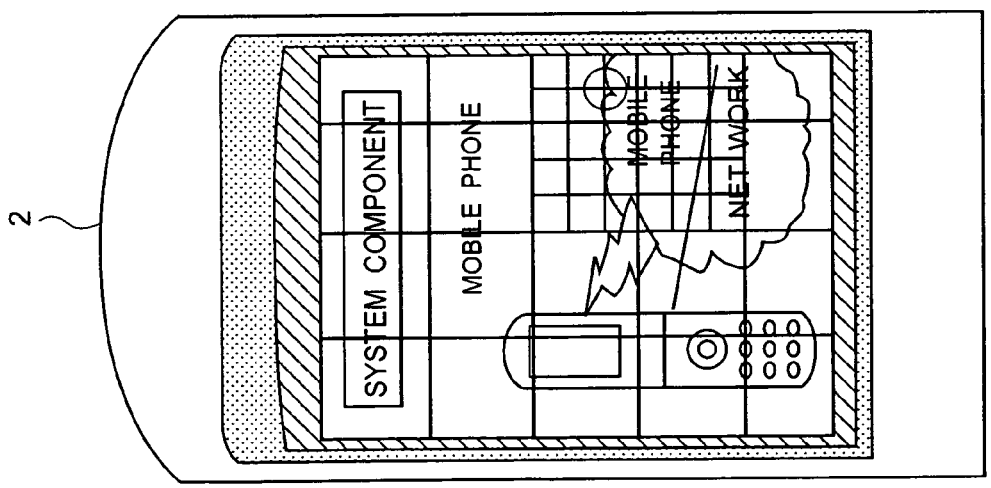

Furthermore, by pushing the "call" button during displaying small grid lines (Yes at ST21), the small grid lines are cleared, and processing is returned to the display status of large grid lines. FIGS. 15A and B show display examples of this cancel operation.

In the third embodiment, in case of changing the processing from the usual operation mode to the quick moving mode of cursor by pushing the "call" button, the present position of the cursor is not changed as shown in FIG. 11A. Based on the kind of an application software operating on the information device 3, it happens that change of the present position of the cursor in the usual operation mode is regarded as specified information. However, in the third embodiment, this application software is not affected.

The Fourth Embodiment

FIGS. 16A~16E are schematic diagrams to explain operation of the mobile phone 2 according to a fourth embodiment.

Basic operation flow of the mobile phone 2 of the fourth embodiment is the same as the third embodiment of FIG. 10. Compared to the third embodiment, the cursor moves differently in case of changing the processing from usual operation mode to quick moving mode of cursor.

In the mobile phone 2 of the fourth embodiment, by pushing the "call" button, large grid lines are displayed and the present position of the cursor is moved to a lattice point in the center of the display. FIG. 16A shows this display status. Other operation is same as the third embodiment.

As inferred from the equation (3), by setting an initial position of the cursor to the center of the display, irrespective of moving on each cell, average of push times of arrow buttons (top and bottom and right and left) can be minimized. In this meaning, the fourth embodiment adds the merit of the first embodiment to the merit of the third embodiment.

In the disclosed embodiments, the processing can be accomplished by a computer-executable program, and this program can be realized in a computer-readable memory device.

In the embodiments, the memory device, such as a magnetic disk, a flexible disk, a hard disk, an optical disk (CD-ROM, CD-R, DVD, and so on), an optical magnetic disk (MD and so on) can be used to store instructions for causing a processor or a computer to perform the processes described above.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device. The component of the device may be arbitrarily composed.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A mobile phone having a function to remotely operate an information device, comprising:
    a communication unit configured to receive information displayed on the information device;
    a display device displaying a part of the information;
    a plurality of operation buttons each inputting an operation signal;
    a display control unit configured to divide a screen of the display device into a plurality of cells, to display a grid line representing a boundary of each cell on the screen, and to display a cursor on the screen, the cursor overlapping the part of the information; and
    an operation control unit configured to move the cursor to one of the cells of the screen in response to the operation signal,
    wherein the plurality of operation buttons includes first buttons of nine units arranged on lattices of three lines and three rows, and a second button of one unit,
    wherein, in response to a push of the second button,
    said display control unit displays a first grid line dividing the screen into first cells of nine units of three lines and three rows, and the cursor located in one of the first cells,
    wherein, in response to a first push of one of the first buttons,
    said operation control unit moves the cursor into one first cell corresponding to the first button of the first push, and
    said display control unit displays a second grid line dividing the one first cell into second cells of nine units of three lines and three rows,
    wherein, in response to a second push of one of the first buttons,
    said operation control unit moves the cursor into one second cell corresponding to the first button of the second push, and
    said display control unit clears the first and second grid lines.

2. A mobile phone having a function to remotely operate an information device, comprising:
    a communication unit configured to receive information displayed on the information device;
    a display device displaying a part of the information;
    a plurality of operation buttons each inputting an operation signal;
    a display control unit configured to divide a screen of the display device into a plurality of cells, to display a grid line representing a boundary of each cell on the screen, and to display a cursor on the screen, the cursor overlapping the part of the information; and
    an operation control unit configured to move the cursor to one of the cells of the screen in response to the operation signal,
    wherein the plurality of operation buttons includes arrow buttons indicating directions of top, bottom, right, and left, a first button of one unit, and a second button of one unit,
    wherein, in response to a push of the first button,
    said display control unit divides the screen into a plurality of first cells, and displays a first grid line as the boundary of each first cell in which one lattice point is a present position of the cursor on the screen,
    wherein, in response to a first push of the arrow buttons,
    said operation control unit moves the cursor on each lattice point of the first grid line in correspondence with a direction of the arrow buttons of the first push,
    wherein, in response to a first push of the second button,
    said display control unit divides the first cell into a plurality of second cells, and displays a second grid line as the boundary of each second cell in which one lattice point is a present position of the cursor on a predetermined area centering around the present position of the cursor, wherein, in response to a second push of the arrow buttons, said operation control unit moves the cursor on each lattice point of the second grid line in correspondence with a direction of the arrow buttons of the second push, wherein, in response to a second push of the second button, said display control unit clears the first and second grid lines.

3. The mobile phone according to claim 2, wherein the second button is located at a center of the arrow buttons.

4. The mobile phone according to claim 2, wherein, when the cursor is moved to outside of a display area of the screen in response to a push of the arrow buttons, said display control unit slides the part of the information along a reverse direction of a moving direction of the cursor on the screen, and displays a new part of the information on the screen.

5. The mobile phone according to claim 2, wherein, when the cursor is moved to outside of a display area of the second grid line in response to a push of the arrow buttons, said display control unit slides the display area of the second grid line along a reverse direction of a moving direction of the cursor on the screen.

6. The mobile phone according to claim 2, wherein, when the first grid line is displayed, said display control unit clears the first grid line in response to a push of the first button.

7. The mobile phone according to claim 2, wherein, when the second grid line is displayed, said display control unit displays the first grid line without the second grid line in response to a push of the first button.

8. A method for controlling a mobile phone remotely operating an information device, comprising:

receiving information displayed on the information device;
displaying a part of the information on a screen of the mobile phone;
inputting an operation signal through a plurality of operation buttons;
dividing the screen into a plurality of cells;
displaying a grid line representing a boundary of each cell on the screen;
displaying a cursor on the screen, the cursor overlapping the part of the information; and
moving the cursor to one of the cells of the screen in response to the operation signal,
wherein the plurality of operation buttons includes first buttons of nine units arranged on lattices of three lines and three rows, and a second button of one unit,
at the displaying a grid line step, in response to a push of the second button,
displaying a first grid line dividing the screen into first cells of nine units of three lines and three rows, and the cursor located in one of the first cells;
at the moving step, in response to a first push of one of the first buttons,
moving the cursor into one first cell corresponding to the first button of the first push; and
displaying a second grid line dividing the one first cell into second cells of nine units of three lines and three rows;
in response to a second push of one of the first buttons,
moving the cursor into one second cell corresponding to the first button of the second push; and
clearing the first and second grid lines.

9. A method for controlling a mobile phone remotely operating an information device, comprising:

receiving information displayed on the information device;
displaying a part of the information on a screen of the mobile phone;
inputting an operation signal through a plurality of operation buttons;
dividing the screen into a plurality of cells;
displaying a grid line representing a boundary of each cell on the screen;
displaying a cursor on the screen, the cursor overlapping the part of the information; and
moving the cursor to one of the cells of the screen in response to the operation signal,
wherein the plurality of operation buttons includes arrow buttons indicating directions of top, bottom, right, and left, a first button of one unit, and a second button of one unit,
at the displaying a grid line step, in response to a push of the first button,
dividing the screen into a plurality of first cells; and
displaying a first grid line as the boundary of each first cell in which one lattice point is a present position of the cursor on the screen;
at the moving step, in response to a first push of the arrow buttons,
moving the cursor on each lattice point of the first grid line in correspondence with a direction of the arrow buttons of the first push;
in response to a first push of the second button,
dividing the first cell into a plurality of second cells; and,
displaying a second grid line as the boundary of each second cell in which one lattice point is a present position of the cursor on a predetermined area centering around the present position of the cursor;
in response to a second push of the arrow buttons,
moving the cursor on each lattice point of the second grid line in correspondence with a direction of the arrow buttons of the second push;
in response to a second push of the second button,
clearing the first and second grid lines.

10. The method according to claim 9, wherein the second button is located at a center of the arrow buttons.

11. The method according to claim 9, further comprising:
when the cursor is moved to outside of a display area of the screen in response to push of the arrow buttons,
sliding the part of the information along a reverse direction of a moving direction of the cursor on the screen; and
displaying a new part of the information on the screen.

12. The method according to claim 9, further comprising:
when the cursor is moved to outside of a display area of the second grid line in response to a push of the arrow buttons,
sliding the display area of the second grid line along a reverse direction of a moving direction of the cursor on the screen.

13. The method according to claim 9, further comprising:
when the first grid line is displayed,
clearing the first grid line in response to a push of the first button.

14. The method according to claim 9, further comprising:
when the second grid line is displayed, displaying the first grid line without the second grid line in response to a push of the first button.

15. A computer readable medium storing program codes for causing a computer to control a mobile phone remotely operating an information device, the program code comprising:
- a first program code to receive information displayed on the information device;
- a second program code to display a part of the information on a screen of the mobile phone;
- a third program code to input an operation signal through a plurality of operation buttons;
- a fourth program code to divide the screen into a plurality of cells;
- a fifth program code to display a grid line representing a boundary of each cell on the screen;
- a sixth program code to display a cursor on the screen, the cursor overlapping the part of the information;
- a seventh program code to move the cursor to one of the cells of the screen in response to the operation signal;

wherein the plurality of operation buttons includes first buttons of nine units arranged on lattices of three lines and three rows, and a second button of one unit, in response to a push of the second button, an eight program code to display a first grid line dividing the screen into first cells of nine units of three lines and three rows, and the cursor located in one of the first cells;

in response to a first push of one of the first buttons, a ninth program code to move the cursor into one first cell corresponding to the first button of the first push; and a tenth program code to display a second grid line dividing the one first cell into second cells of nine units of three lines and three rows;

in response to a second push of one of the first buttons, an eleventh program code to move the cursor into one second cell corresponding to the first button of the second push; and a twelfth program code to clear the first and second grid lines.

* * * * *